(12) United States Patent
Flosbach et al.

(10) Patent No.: US 6,586,552 B2
(45) Date of Patent: Jul. 1, 2003

(54) AMINOAZOLE-BLOCKED ISOCYANATE COMPONENTS

(75) Inventors: Carmen Flosbach, Wuppertal (DE); Patrick Gloeckner, Wuppertal (DE); Michael Herm, Velbert (DE); Helmut Ritter, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/828,749

(22) Filed: Apr. 9, 2001

(65) Prior Publication Data

US 2002/0147294 A1 Oct. 10, 2002

(51) Int. Cl.[7] .............................................. C08G 18/80
(52) U.S. Cl. ........................ 528/45; 528/75; 528/73; 528/423; 252/182.22; 252/182.2; 548/262.4; 548/265.4; 526/258; 526/302
(58) Field of Search ........................ 528/45, 75, 73, 528/423; 252/182.22, 182.2; 548/262.4, 265.4; 526/258, 302

(56) References Cited

U.S. PATENT DOCUMENTS

| | | | | |
|---|---|---|---|---|
| 4,677,221 A | * | 6/1987 | Muller et al. |
| 4,762,752 A | * | 8/1988 | Haubennestel et al. |
| 4,976,837 A | | 12/1990 | Hughes et al. |
| 5,425,900 A | * | 6/1995 | Quednau |
| 5,596,064 A | | 1/1997 | König et al. |
| 5,688,858 A | * | 11/1997 | Quednau et al. |
| 5,889,106 A | | 3/1999 | Kurek et al. |
| 6,051,675 A | | 4/2000 | Gras |

FOREIGN PATENT DOCUMENTS

EP  1041097 A2  10/2000

* cited by examiner

*Primary Examiner*—Rachel Gorr
(74) *Attorney, Agent, or Firm*—Sudhir G. Deshmukh

(57) ABSTRACT

Aminoazole-blocked isocyanate components can be used as self crosslinking binders in heat-curable compositions.

9 Claims, No Drawings ing composition containing polyisocyanate components blocked with at least one aminoazole.

AMINOAZOLE-BLOCKED ISOCYANATE COMPONENTS

FIELD OF THE INVENTION

The present invention relates to aminoazole-blocked isocyanate components and to thermally curable compositions containing polyisocyanate components blocked with at least one aminoazole.

BACKGROUND OF THE INVENTION

Azole-blocked isocyanates, in particular polyisocyanates, are known, as shown in U.S. Pat. Nos. 4,976,837, 5,596,064, 5,889,106, 6,051,675 and EP-A-1 041 097. They may be used as crosslinking agents in thermally curable compositions based on binders with groups comprising active hydrogen, such as in particular binders comprising hydroxyl groups and/or primary and/or secondary amino groups. When heated, they eliminate the azole blocking agent to regenerate free isocyanate groups, which then react by addition with the binder groups comprising active hydrogen and are thus able to effect crosslinking.

Novel blocked isocyanate components have now been found which are thermally self crosslinkable and may be used in thermally self and/or externally crosslinkable compositions.

SUMMARY OF THE INVENTION

This invention provides isocyanate components blocked with at least one aminoazole, wherein the isocyanate components are selected from the group consisting of monoisocyanates with at least one olefinically unsaturated double bond per molecule and polyisocyanates.

DETAILED DESCRIPTION OF THE EMBODIMENTS

Examples of aminoazole-blockable monoisocyanates with at least one olefinically unsaturated double bond per molecule are in particular free-radically homo- or copolymerisable monoisocyanates, such as, dimethyl-m-isopropenylbenzyl isocyanate or isocyanatoalkyl (meth) acrylates, such as, isocyanatoethyl (meth)acrylate.

Examples of aminoazole-blockable polyisocyanates are diisocyanates, such as, aliphatic, cycloaliphatic, aromatic or araliphatic diisocyanates, for example, hexane diisocyanate, trimethylhexane diisocyanate, isophorone diisocyanate, cyclohexane diisocyanate, biscyclohexylmethane diisocyanate, norbornane diisocyanate, diphenylmethane diisocyanate, tetramethylxylylene diisocyanate, tolylene diisocyanate, phenylene diisocyanate, naphthylene diisocyanate, xylylene diisocyanate as well as triisocyanates, such as, trisisocyanatononane.

Further examples of aminoazole-blockable polyisocyanates are oligomeric polyisocyanates derived from diisocyanates, for example from diisocyanates stated in the preceding paragraph, and having number average molecular masses in the range from for example 336 to 1000 and isocyanate contents of, for example, 8 to 25 wt. %, in particular, such polyisocyanate oligomers which contain heteroatoms in the residue linking the isocyanate groups. Examples of such substances are corresponding polyisocyanates comprising carbodiimide groups, allophanate groups, uretidione groups, isocyanurate groups, urethane groups and/or biuret groups. Particularly preferred compounds are uretidione polyisocyanates, biuret polyisocyanates, isocyanurate polyisocyanates or allophanate polyisocyanates each derived from hexane diisocyanate, uretidione polyisocyanates or isocyanurate polyisocyanates derived from isophorone diisocyanate and addition products of 3 mols of tolylene diisocyanate and 1 mol of triol, such as, trimethylolpropane.

Further aminoazole-blockable polyisocyanates are isocyanate-functional polymers having number average molecular masses of for example 800 to 10,000 and isocyanate contents of, for example, 2 to 27 wt. %. Processes for the production of such isocyanate-functional polymers are known to the person skilled in the art.

Production may, for example, proceed by free-radical homo- or copolymerisation of monoisocyanates with at least one olefinically unsaturated double bond per molecule.

Isocyanate-functional polymers may in particular also be produced by reacting simple polyisocyanates, for example above-stated simple diisocyanates or oligomeric polyisocyanates, in particular diisocyanates, with substoichiometric quantities of organic compounds with at least two groups capable of reacting with isocyanate groups. Compounds of this kind that are preferably used are compounds comprising at least two primary and/or secondary amino groups and/or hydroxyl groups. Examples are low molecular weight polyols, polyamines and/or amino alcohols, such as, ethylene glycol, hexanediol, neopentyl glycol, butylethylpropanediol, cyclohexanedimethanol, trimethylolpropane, pentaerythritol, ethylenediamine, diethylenetriamine, ethanolamine, methylethanolamine, as well as oligomeric or polymeric compounds having a number average molecular mass of 300 to 5,000. Examples of the latter are polymeric polyols, for example, polyester polyols, polyethers polyols and/or hydroxy-functional acrylate resins known per se in polyurethane chemistry.

The blocked polyisocyanate components according to the invention are blocked with at least one aminoazole, wherein the single or various aminoazoles are in each case bound as a monofunctional blocking agent. For the purposes of the present invention, aminoazoles comprise 5-membered aromatic nitrogen heterocycles with a hydrogen-bearing nitrogen atom as one of the 5 ring members (azole nitrogen) together with a primary or secondary, preferably primary, amino group as an amino substituent on one of the C atoms of the azole ring. Depending upon the type of azole, further substituents may be present on the azole ring. Preferably, however, such further substituents may not contain active hydrogen. In particular, in addition to the directly bound amino substituents, the aminoazoles comprise no further hydroxyl or amino groups directly or indirectly bound to the aminoazole. The azole ring may also be a component of a fused ring system.

Examples of amino-substituted azole ring systems of the above-stated type are corresponding pyrrole, pyrazole, imidazole, 1,2,3- and 1,2,4-triazole, benzindazole and benzimidazole derivatives. The preferred blocking agent for the purposes of the present invention is 3-amino-1,2,4-triazole.

The isocyanate groups to be blocked of the polyisocyanate components are preferably exclusively blocked with at least one aminoazole. If desired, however, up to 80%, preferably no more than 50% of the isocyanate groups to be blocked may be blocked with other monofunctional blocking agents. Other blocking agents that may be considered alone or in combination are monofunctional compounds known for blocking isocyanates, such as, the CH-acidic, NH-, SH- or OH-functional compounds known for this purpose. Examples are CH-acidic compounds, such as, acetylacetone or CH-acidic esters, such as, acetoacetic acid alkyl esters, malonic acid dialkyl esters; aliphatic or cycloaliphatic alcohols, such as, n-butanol, 2-ethylhexanol, cyclohexanol; phenols; oximes, such as, methyl ethyl ketoxime, acetone oxime, cyclohexanone oxime; lactams, such as, caprolactam; azole blocking agents of the imidazole, pyrazole, triazole or tetrazole type hitherto known as blocking agents and which do not contain amino substituents.

While the production of aminoazole-blocked monoisocyanate components is trivial, blocked polyisocyanate components according to the invention may be produced by reacting the free isocyanate groups of the polyisocyanate components with at least one aminoazole, optionally, together with at least one further monofunctional blocking agent.

Where the polyisocyanate components are completely and exclusively blocked with aminoazole in an equivalent ratio of 1 mol of aminoazole per mol of isocyanate groups, it is expedient to add the polyisocyanate to the aminoazole, although the opposite mode of addition is also possible. The polyisocyanate and aminoazole are preferably brought into contact in the shortest possible time, wherein adequate cooling to abate the heat evolved during the exothermic blocking reaction should be provided. The reaction temperature should preferably not exceed 60° C., particularly preferably 50° C.

When producing co-blocked polyisocyanate components according to the invention, the polyisocyanate component is reacted with 0.2 to less than 1 mol of aminoazole and greater than 0 to 0.8 mol of at least one monofunctional blocking agent other than aminoazole per mol of isocyanate groups to be blocked, wherein the 0.2 to less than 1 mol of aminoazole used as a monofunctional blocking agent and the 0 to 0.8 mol of at least one monofunctional blocking agent other than aminoazole together add up to 1 mol of monofunctional blocking agent.

The reaction may proceed in accordance with the conventional processing principles known for the production of co-blocked polyisocyanate components, as a single stage process, in which all the blocking agents are simultaneously reacted with the polyisocyanate, or as a multistage process, for example, by initially performing partial blocking with aminoazole and then reacting any remaining free isocyanate groups with further blocking agents. Preferably, however, co-blocking is performed in the reverse order. Also, in co-blocking, it is preferred to add the polyisocyanate to the blocking agents and to provide adequate cooling. In this case as well, the reaction temperature should preferably not exceed 60° C., particularly preferably 50° C.

Alternatively, the polyisocyanate components blocked with at least one aminoazole may be produced by (partially) blocking simple isocyanate components with aminoazole and optionally, at least one further blocking agent and then reacting them to yield blocked oligomeric or polymeric polyisocyanate components according to the invention.

For example, a monoisocyanate comprising at least one olefinically unsaturated double bond may be blocked exclusively with aminoazole or optionally, a proportion of such a monoisocyanate may be blocked with aminoazole and the remainder with at least one further monofunctional blocking agent, and then be free-radically homopolymerized or copolymerized together with appropriate olefinically unsaturated comonomers.

A polyisocyanate may, for example, also initially be partially blocked with at least one aminoazole and optionally, at least one further blocking agent, in particular a diisocyanate may be half-blocked with at least one aminoazole and optionally, at least one further blocking agent and then used as a synthesis building block for synthesizing oligomeric or polymeric polyisocyanate components according to the invention. The synthesis methods used for this purpose are those known to the person skilled in the art, either those which give rise to molecular synthesis with direct involvement of remaining unblocked isocyanate groups or those wherein remaining unblocked isocyanate groups are initially reacted with a compound which comprises, in addition to at least one group comprising active hydrogen, at least one further functional group. The latter may subsequently be used to synthesize oligomeric or polymeric components. The reaction of remaining unblocked isocyanate groups with hydroxyalkyl (meth) acrylate may be mentioned merely by way of example, wherein blocked polyisocyanates are obtained, the olefinically unsaturated double bonds of which may be used to synthesize oligomeric or polymeric products, for example by means of free-radical polymerization.

All the reactions required for the production of the blocked isocyanate components according to the invention which involve free isocyanate groups proceed of course in the absence of water and solvents comprising active hydrogen. Such reactions are accordingly performed without solvent, for example, in a melt, or in solvents which contain no active hydrogen. Examples of suitable solvents are N-methylpyrrolidone, dimethylformamide, ketones, such as, acetone, methyl ethyl ketone, cyclohexanone, esters, such as, butyl acetate and ethyl acetate.

In addition to the blocked isocyanate groups, the blocked polyisocyanate components according to the invention may contain one or more further functional groups, for example, hydroxyl groups or (meth)acryloyl groups. The synthesis building blocks required for introducing such groups are known to the person skilled in the art. Selection of the nature and quantity thereof and selection of further synthesis building blocks which influence physical properties are determined by the particular area of application of the blocked polyisocyanate components according to the invention and the range of requirements associated therewith.

The blocked polyisocyanate components according to the invention are self crosslinking. They may be cured to yield polymers when heated to temperatures of, for example, 120 to 200° C. They may accordingly be used as self crosslinking binders in heat-curable compositions, such as sealing compositions, coating compositions, adhesives, impregnating agents, casting compositions, molding compositions. Such compositions may comprise aqueous, solvent-based or solvent-free compositions in liquid, pasty or powder form. The blocked polyisocyanates according to the invention may also be present in such compositions in combination with other binders, in particular binders that contain groups comprising active hydrogen, for example, in a ratio by weight of greater than 0 to 95 wt. % of binder: 5 to less than 100 wt. % of blocked polyisocyanate component according to the invention. Such compositions comprise both externally and self crosslinking compositions. When combined with other binders that contain groups comprising active hydrogen, the ratio of groups comprising active hydrogen from the other binders to blocked isocyanate groups of the blocked polyisocyanate components according to the invention is for example 0.5:1 to 1.5:1.

The following examples illustrate the invention.

EXAMPLES

Examples 1 to 3

These examples show the production of polyisocyanate components blocked with 3-amino-1,2,4-triazole.

Example 1

55 g of 3-amino-1,2,4-triazole were dissolved in 77 g of N-methylpyrrolidone while being stirred at 100° C. After cooling to 50° C., 125 g of hexane diisocyanate isocyanurate were added in portions while being cooled, such that the temperature did not exceed 50° C. The mixture was then diluted with 43 g of butyl acetate and stirred until the NCO value had fallen to below 0.1%.

Example 2

66 g of 3-amino-1,2,4-triazole were dissolved in 103 g of N-methylpyrrolidone while being stirred at 100° C. After cooling to 50° C., 174 g of isophorone diisocyanate isocyanurate were added in portions while being cooled, such that the temperature did not exceed 50° C. The mixture was then diluted with 57 g of butyl acetate and stirred until the NCO value had fallen to below 0.1%.

Example 3 a) 84 g of 3-amino-1,2,4-triazole were dissolved in 400 g of N-methylpyrrolidone and 0.5 g of dibutyltin dilaurate and 0.1 g of 4-methoxyphenol were added. While the mixture was stirred under nitrogen, 155 g of 2-isocyanatoethyl methacrylate in 400 g of N-methylpyrrolidone were added at 40° C. and the batch stirred at 50° C. until the NCO content was <0.1. The product was precipitated from water. The precipitate was washed with water and the product dried under a vacuum.

b) 10 g of the product obtained in a) were dissolved under nitrogen with 50 g of methyl methacrylate and 1 g of 2,2'-azobisisobutyronitrile in 100 g of dimethylformamide and the mixture stirred for 12 hours at 80° C. The resultant copolymer was precipitated from water and dried under a vacuum.

Example 4

310 g of xylene and 186 g of glycidyl versatate (epoxy equivalent weight 245) were mixed and heated to 142° C. and a mixture of 145 g of methyl methacrylate, 135 g of hydroxyethyl methacrylate, 6 g of tert.-dodecyl mercaptan, 195 g of styrene, 57 g of acrylic acid, 15 g of di-tert.-butyl peroxide was added at a uniform rate over three hours and polymerized and condensed at 135° C. over 5 hours to produce a solution of a hydroxy-functional methacrylic copolymer.

Examples 5 to 7

These examples show the production of coating layers.

In each case, the pendulum hardness of the coatings was determined according to DIN EN ISO 1522.

Example 5

The solution from Example 1 was diluted to a solids content of 50 wt. % with a 1:2 mixture of butyl acetate and N-methylpyrrolidone and applied to a dry film thickness of 30 μm onto a glass sheet and stoved (baked) for 20 minutes at 140° C. to yield a clear, colorless coating (pendulum hardness: 154 oscillations).

By way of comparison, the same method was used, but the coating was only physically dried for 18 hours at 40° C. (pendulum hardness: 37 oscillations).

Example 6

The solution from Example 1 was mixed with the solution from Example 4 in a ratio such that isocyanate groups blocked with 3-amino-1,2,4-triazole and hydroxyl groups were present in a 1:1 ratio. This mixture was diluted to a solids content of 50 wt. % and applied to a dry film thickness of 30 μm onto a glass sheet and stoved (baked) for 20 minutes at 140° C. to yield a clear, colorless coating. (Pendulum hardness: 135 oscillations).

By way of comparison, the same method was used, but the coating was only physically dried for 18 hours at 40° C. (pendulum hardness: 55 oscillations).

Example 7

40 g of the product from Example 3 were dissolved in 60 g of dimethylformamide and applied to a dry film thickness of 30 μm onto a glass sheet and stoved (baked) for 20 minutes at 140° C. to yield a clear, colorless coating. (Pendulum hardness: 139 oscillations).

By way of comparison, the same method was used, but the coating was only physically dried for 18 hours at 40° C. (pendulum hardness: 112 oscillations).

What is claimed is:

1. A blocked isocyanate compound comprising an aminoazole-blocked monoisocyanate having at least one olefinically unsaturated bond per molecule.

2. The blocked isocyanate compound of claim 1 in which the aminoazole consists of 3-amino-1,2,4-triazole.

3. A blocked polyisocyanate self-crosslinkable component comprising a polyisocyanate having isocyanate groups blocked with at least one monofunctional blocking agent;

wherein said polyisocyanate is selected from the group consisting of diisocyanates, triisocyanates, oligomeric polyisocyanates derived from diisocyanates, and isocyanate-functional polymers, wherein the isocyanate-functional polymers are selected from the group consisting of isocyanate-functional polymers prepared by free-radical polymerization of monoisocyanates having at least one olefinically unsaturated double bond per molecule, said monoisocyanates being selected from the group consisting of dimethyl-m-isopropenylbenzyl isocyanate, isocyanatoalkyl (meth) acrylates and combinations thereof, and polyisocyanates prepared by reacting simple polyisocyanates with sub-stoichiometric quantities of organic compounds having at least two groups selected from the groups consisting of primary amino groups, secondary amino groups, hydroxyl groups and any combinations thereof, said organic compounds being selected from the group consisting of low molecular weight polyols, polyamines, amino alcohols, oligomeric compounds and polymeric compounds, said oligomeric and polymeric compounds having a number average molecular mass of 300 to 5,000 and being selected from the group consisting of polyester polyols, polyether polyols and any combinations thereof;

wherein the monofunctional blocking agent consists of 20 to 100% of an aminoazole and 0 to 80% of a blocking agent selected from the group consisting of CH-acidic compounds, phenols, oximes, lactams, azole blocking agents that do not contain amino substituents, and any combinations thereof;

further wherein said aminoazole comprises a 5-member aromatic nitrogen heterocycle having a hydrogen-bearing nitrogen atom as a member of the 5-member aromatic nitrogen heterocycle and an amino group selected from the group consisting of primary and secondary amino groups as a substituent on a carbon atom member of the 5-member aromatic nitrogen heterocycle.

4. The blocked polyisocyanate self-crosslinkable component of claim 3, wherein the aminoazole consists of 3-amino-1,2,4-triazole.

5. The blocked polyisocyanate self-crosslinkable component of claim 3, wherein the blocked polyisocyanate comprises at least one additional functional group.

6. The blocked polyisocyanate self-crosslinkable component of claim 5, wherein the aminoazole consists of 3-amino-1,2,4-triazole.

7. A heat curable coating composition containing the blocked polyisocyanate self-crosslinkable component of claim 3.

8. A heat curable coating composition containing the blocked polyisocyanate self-crosslinkable component of claim 5.

9. A heat curable composition selected from the group consisting of sealing compositions, coating compositions, adhesive compositions, impregnating compositions, casting compositions and molding compositions containing the blocked polyisocyanate self-crosslinkable component of claim 3.

* * * * *